UNITED STATES PATENT OFFICE.

JOHN REICHEL, OF PHILADELPHIA, AND HENRY WERNER, OF GLENOLDEN, PENNSYLVANIA, ASSIGNORS TO H. K. MULFORD COMPANY, OF PHILADELPHIA, PENNSYLVANIA, A CORPORATION OF PENNSYLVANIA.

PROCESS OF TREATING HOG-CHOLERA ANTITOXIN.

1,183,591.      Specification of Letters Patent.      Patented May 16, 1916.

No Drawing.      Application filed July 1, 1915. Serial No. 37,533.

*To all whom it may concern:*

Be it known that we, JOHN REICHEL, a citizen of the United States, residing at Philadelphia, county of Philadelphia, State of Pennsylvania, and HENRY WERNER, a subject of Great Britain, residing at Glenolden, in the county of Delaware and State of Pennsylvania, have invented certain new and useful improvements in the process of treating hog-cholera antitoxin to obtain the plasma or serum practically free from cellular debris, fibrin clots, hemoglobin, and living and killed germs, of which the following is a specification.

This invention relates to a new and useful process of treating hog cholera "antitoxin" to obtain the plasma or serum practically free from cellular debris, fibrin clots, hemoglobin, living and killed germs, and in which treatment blood of hyperimmunized hogs is prevented from coagulating and hemolysis inhibited in the production of hog cholera "antitoxin", obtaining substantially a maximum yield of hog cholera "antitoxin", in the form of plasma or serum. In carrying out the process, tail bleedings and throat or final bleedings may be similarly treated, and therefore the process in practice is not to be considered as restricted to any particular method of bleeding or manner of bleeding. Injections of virulent blood or virus, from a hog sick of hog cholera or the cause of hog cholera, into an animal immune from hog cholera, produces in the blood of the immune animal antibodies or hog cholera "antitoxin" which may be obtained in the defibrinated blood, serum or plasma containing many substances aside from the watery portion, such as the globulins, serum albumens, cellular debris, fibrin, living or dead germs and salts, among which the hog cholera antibodies are included as part or are closely associated therewith. It is to the hog chlorea "antitoxin" obtained in this way or to the said hog chlorea "antitoxin" obtained in other ways that our new and useful process relates more particularly, and the process is carried out by the following treatment of the blood from the immune hog, in order to recover therefrom the hog cholera "antitoxin" in the form of plasma or serum, separated from the fibrin clots, hemoglobin, cellular debris and the living or dead germs.

The process is preferably carried out by estimating the amount of blood or hog cholera "antitoxin" to be drawn from the hyperimmunized hog and placing the proper proportion of a mixture of chemical reagents in the container in which the blood is collected to prevent coagulation and inhibit hemolysis. A chemical that will prevent coagulation may not effectually inhibit hemolysis and when an attempt is subsequently made to separate the plasma from the cellular elements by filtration or other mechanical means, the cellular elements hemolyze, rapidly resulting in a hemolyzed plasma or serum.

We have discovered that coagulation may be entirely prevented and hemolysis inhibited by the use of a mixture of chemical reagents that will prevent coagulation, as for example, a solution of sodium citrate or ammonium oxalate and a solution of an aldehyde in the proper proportion, as for example, formaldehyde in 0.005 to 0.02 per cent. concentration to the volume of the bleeding. The formaldehyde is preferably included in the mixture of the chemical reagents in the concentration of a one per cent. solution of formaldehyde in physiological salt solution. We do not mean, however, to limit ourselves to the exact quantities above specified, since it is within the scope of our invention that a smaller or larger proportion can be used instead of the precise amounts we have given, but with results less desirable, in our judgment, than those obtained by using practically the amounts which we have found to be preferable. This proportion of an aldehyde, as for example, formaldehyde, aside from inhibiting hemolysis, acts on the cellular elements of the blood, causing shrinkage and hardening and, as the shrunken and hardened cells are allowed to settle and the plasma is separated from the cellular elements mechanically, either by filtration or centrifugal force, more plasma is realized. This action of the aldehyde on the cellular elements insures a large yield of plasma.

In our attempt to avoid unnecessarily diluting the hog cholera "antitoxin" in the form of plasma or serum, with the solution of the chemical reagents to prevent coagulation and inhibit hemolysis, we made the discovery that a saturated solution of the chemicals known to prevent coagulation could be used in very small amounts, as for example, saturated sodium citrate solution. Sodium citrate solution as generally used to prevent coagulation in the proportion of 22.8 grams of the salt in 142.8 c.c. of physiological salt solution for 1000 c.c. of hog blood, dilutes the blood from seven volumes to eight volumes. The discovery was made that from 5 to 25 c. c. of a saturated solution of the chemical reagent in water prevented coagulation in 1000 c.c. of hog blood, thus barely diluting the blood. In arranging for a bleeding of 1000 c.c. of hog cholera "antitoxin" in the form of blood from hyperimmunized hogs, we have found that the mixture of the chemical reagents which will prevent coagulation and inhibit hemolysis may preferably include approximately 15 c.c. of a saturated solution of sodium citrate in water and 10 c.c. of a one per cent. solution of formaldehyde in water. The mixture may be used as one solution or the two reagents used separately, allowing first one to act and then adding the other in any order; however, we prefer to mix the reagents and collect the blood from hyperimmunized hogs directly in the mixture in a suitable container. The same results may be secured, however, in using the reagents separately in any order or pouring both or either one into the blood drawn. The blood and reagents may be brought together at any time before the coagulation and hemolysis have advanced sufficiently to nullify the action of the reagents for the purpose for which we use the reagents, to wit—to prevent coagulation and inhibit hemolysis; we find it preferable to bring the blood and reagents together, substantially at the time of bleeding.

The treated hog cholera "antitoxin" or blood from a hyperimmunized hog is permitted to stand for a sufficient length of time to allow the cellular elements, including the blood cells, to shrink and harden, which prevents hemolysis and liberates the serum in the cells. We have found that overnight, say, substantially twelve hours, is sufficient length of time. During this time, settling of the cellular elements occurs and these elements may subsequently be entirely removed by filtration, centrifugal force or other mechanical means. The plasma may be decanted or siphoned off, filtered through sterilizing filters and a preservative be added, as for example, one of the cresylic acids, either before or after filtration. The cellular elements or residue may be further treated with a dilution of the mixture of said chemical reagent, gently shaken and allowed to stand or removed by filtration, centrifugal force or other mechanical means, thus recovering to that extent, more of the available plasma.

Claims:

1. The process of treating hog cholera "antitoxin" in the form of blood from hyperimmunized hogs with a solution of an aldehyde, as for example, formaldehyde, to inhibit hemolysis.

2. The process of treating hog cholera "antitoxin" in the form of blood from hyperimmunized hogs with a saturated solution of chemical reagents to prevent coagulation.

3. The process of treating hog cholera "antitoxin" in the form of blood from hyperimmunized hogs, with a chemical reagent to prevent coagulation and a solution of an aldehyde to inhibit hemolysis.

4. The process of treating hog cholera "antitoxin" in the form of blood from hyperimmunized hogs, with a chemical reagent to prevent coagulation and a solution of an aldehyde to inhibit hemolysis, practically at the same time.

5. The process of treating hog cholera "antitoxin" in the form of blood from hyperimmunized hogs, with a chemical reagent to prevent coagulation and a solution of an aldehyde to inhibit hemolysis, at practically one and the same time.

6. The process of practically freeing hog cholera "antitoxin", in the form of blood from hyperimmunized hogs, of cells, cellular debris, hemoglobin, fibrin clots, and living and killed germs, by treating the same with a saturated chemical reagent to prevent coagulation and with a solution of an aldehyde to inhibit hemolysis, allowing the composition to stand to permit shrinkage and hardening of the cellular elements, and filtering, centrifugalizing or separating mechanically the cellular elements from the liquid portion, decanting or siphoning off the plasma or serum, and filtering same through sterilizing filters.

7. The process of freeing hog cholera "antitoxin", in the form of blood from hyperimmunized hogs, of cells, cellular debris, hemoglobin, fibrin clots, and living and killed germs, by treating the same with a mixture comprising a saturated chemical reagent and a solution of an aldehyde, allowing the composition to stand to permit shrinkage and hardening of the cellular elements, and filtering, centrifugalizing or separating mechanically the said elements from the supernatant liquid, decanting or siphoning off the plasma or serum and filtering same through sterilizing filters.

8. The process of practically freeing hog cholera "antitoxin", in the form of blood from hyperimmunized hogs, of cells, cellular debris, hemoglobin, fibrin clots, and living and killed germs, by treating the same with a saturated chemical reagent to prevent coagulation and with a solution of an aldehyde to inhibit hemolysis, allowing the composition to stand to permit shrinkage and hardening of the cellular elements, and filtering, centrifugalizing or separating mechanically the cellular elements from the liquid portion, decanting or siphoning off the plasma or serum, and filtering same through sterilizing filters, adding a preservative.

9. The process of collecting the bleeding or hog cholera "antitoxin" from a hyperimmunized hog directly into a solution of an aldehyde, as for example, formaldehyde, to inhibit hemolysis.

10. The process of collecting the bleeding or hog cholera "antitoxin" from a hyperimmunized hog directly into a saturated chemical solution, as for example, sodium citrate, to prevent coagulation.

11. The process of collecting the bleeding or hog cholera "antitoxin" from a hyperimmunized hog directly into a mixture composed of a saturated solution of chemical reagent and a solution of an aldehyde.

12. The process of collecting the bleeding or hog cholera "antitoxin" from a hyperimmunized hog directly into a mixture comprised of a saturated solution of a chemical reagent and a solution of an aldehyde, allowing the composition to stand to permit shrinkage and hardening of the cellular elements, and filtering, centrifugalizing or mechanically separating the said elements from the supernatant liquid, decanting or siphoning off the plasma or serum and filtering through sterilizing filters.

In testimony whereof we affix our signatures in presence of two witnesses.

JOHN REICHEL.
HENRY WERNER.

Witnesses:
MILDRED CAMPBELL,
WALTER L. MYERS.